United States Patent [19]

McLain et al.

[11] Patent Number: 5,095,098

[45] Date of Patent: Mar. 10, 1992

[54] YTTRIUM AND RARE EARTH COMPOUNDS CATALYZED LACTONE POLYMERIZATION

[75] Inventors: Stephan J. McLain, Hockessin; Neville E. Drysdale, Newark, both of Del.

[73] Assignee: E. I. Du Pont de Nemours and Company, Wilmington, Del.

[21] Appl. No.: 680,165

[22] Filed: Apr. 3, 1991

Related U.S. Application Data

[62] Division of Ser. No. 414,964, Sep. 29, 1989, Pat. No. 5,028,667.

[51] Int. Cl.$^5$ ............................................. C07F 15/00
[52] U.S. Cl. ........................................................ 534/15
[58] Field of Search ............................................ 534/15

[56] References Cited

U.S. PATENT DOCUMENTS

| | | | |
|---|---|---|---|
| 2,878,236 | 3/1959 | Young et al. | 528/357 |
| 3,169,945 | 2/1965 | Hostettler et al. | 260/78.3 |
| 4,289,873 | 9/1981 | Kubo et al. | 528/357 |
| 4,357,462 | 11/1982 | Kubo et al. | 528/357 |
| 4,719,246 | 1/1988 | Murdoch et al. | 521/134 |
| 4,766,182 | 8/1988 | Murdoch et al. | 525/413 |
| 4,800,219 | 1/1989 | Murdoch et al. | 525/413 |

Primary Examiner—Robert L. Stoll
Assistant Examiner—C. Sayala

[57] ABSTRACT

Process for yttrium and rare earth compound catalyzed polymerization of lactones and the living polymer compositions of such polymerizations, novel polyester products of such polymerizations and novel yttrium and rare earth metal compounds useful as catalysts in the polymerization of biodegradable polymers for medical uses and flexible films for packaging.

2 Claims, No Drawings

YTTRIUM AND RARE EARTH COMPOUNDS CATALYZED LACTONE POLYMERIZATION

This is a divisional application of U.S. Ser. No. 07/414,964, filed Sept. 29, 1989, now U.S. Pat. No. 5,028,667.

BACKGROUND OF THE INVENTION

1. Field of the Invention

This invention relates to a process for yttrium and rare earth compound catalyzed polymerization of lactones. Also provided are the living polymer compositions of such polymerizations, novel polyester products of such polymerizations and novel yttrium and rare earth metal compounds useful as catalysts in the polymerization. The resulting polymers are used in biodegradable polymers for medical uses and flexible films for packaging.

2. Background Art

A. Hamitou, R. Jerome, and PH. Teyssie, Journal of Polymer Science, Polymer Chemistry Edition, Vol. 15, 1035-1041 (1977) disclose the use of -oxoalkoxides of the following formula $$(RO)_{p-1}M_2{}^pOM_1{}^{II}OM_2{}^p(OR)_{p-1}$$

wherein $M_1{}^{II}$ is Zn, Co, Mo, Fe, Cr, and Mn; $M_2{}^p$ is Al(III) and Ti(IV) and R is any n-, sec- or tert-alkoxy group as highly active catalysts for ring opening lactone polymerization. This fast and living ring opening polymerization of lactones by these catalysts in homogeneous organic media has led to successful block copolymerization.

X. D. Feng, C. X. Song, and W. Y. Chen, Journal of Polymer Science, Polymer Letters Edition, Vol. 21, 593-600 (1983) used [(n-C$_4$H$_9$O)$_2$AlO]$_2$Zn, a catalyst used by Hamitou et al., above, to polymerize ε-caprolactone and R,S-lactide, either to form homopolymers or block copolymers of these monomers. The polymers are reported to have n-butoxy end groups.

H. R. Kricheldorf, M. Merl and N. Schrnagl, Macromolecules, Vol. 21 (1988), pp. 286-293 used alkoxides of Al, Ti, Zr and Sn to polymerize lactide and ε-caprolactone, and reported such polymerizations to be living. The polymer hydrocarbyloxy end groups, which originated as part of the metal hydrocarbyloxide initiator, are identified and quantitated in this paper.

A commercial literature booklet, "TONE" Polymers, Union Carbide Corp., 1988, p. 1 discloses that the polylactone polymers "TONE" P-300 and P-700 have the end group HOR—O—[—C(—C(=O)... where R is an alkylene group.

JP 46/40708 [71/40708]discloses a process whereby yttrium ethoxide or yttrium 8-hydroxyquinolate catalyze the polycondensation of dimethyl terephthalate with ethylene glycol at 180°-210° and at 280° at 0.2 mm pressure to give colorless poly(ethylene terephthalate).

U.S. Pat. Nos. 4,719,246, 4,766,182 and 4,800,219 describe the preparation, properties, and uses of a Polylactide "stereocomplex" which contains interlocked segments of poly(S-lactide) and poly(R-lactide) prepared from one polymer that contains segments of poly(S-lactide) and another polymer which contains segments of poly(R-lactide).

A review of rare earth chemistry is found in R. C. Mehrotra, P. N. Kapoor and J. M. Batwara, Coordination Chemistry Reviews, Vol. 31 (1980), pp. 67-91.

Methods for the preparation of yttrium, dysprosium and ytterbium alkoxides are found in K. S. Mazdiyasni, C. T. Lynch and J. S. Smith, Inorganic Chemistry, Vol. 5 (1966), pp. 312-316.

SUMMARY OF THE INVENTION

The present invention concerns a process for the polymerization of one or more lactones selected from

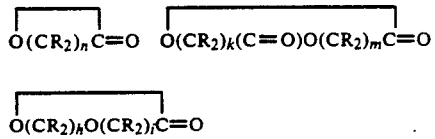

by contacting the lactones with one or more catalysts having the formula MZ$_3$ wherein n is 4 or 5, h, i, k and m are independently one or two; each R is independently selected from H or hydrocarbyl containing up to 12 carbon atoms or substituted hydrocarbyl containing up to 12 carbon atoms, M is chosen from yttrium or the rare earth metals, and Z is independently chosen from —OCR$^1{}_3$, —NR$^1{}_2$, and —CR$^1{}_3$, wherein each R$^1$ is independently chosen from hydrogen, hydrocarbyl and substituted hydrocarbyl.

Also provided is a lactone polymer having a living end, wherein the living end consists essentially of a yttrium or rare earth metal alkoxide, the alkoxide oxygen being the terminal atom of the polylactone. Such living ended polymers can be further polymerized to increase the molecular weight, or can be reacted with a second lactone monomer to form a block copolymer.

Also provided are novel polymers of the formula $$T[C(=O)(CR_2)_nO]_pH,$$

$$T\{[C(=O)(CR_2)_kO(C=O)(CR_2)_mO]_q[C(=O)(CR_2)_mO(C=O)(CR_2)_kO]_r\}H$$

and $$T[C(=O)(CR_2)_iO(CR_2)_hO]_pH$$

wherein h, i, k, m, n, and R are as defined above, p and q+r are 3 or more, and T is —OCR$^2{}_3$, and each R$^2$ is independently hydrogen or substituted hydrocarbyl.

Also provided are block copolymers comprising at least one block of poly(R-lactide) and at least one block of poly(S-lactide).

Also provided are new compositions useful as catalysts in the polymerization of lactones The compositions include yttrium tris(2-phenylthioethoxide), yttrium tris(1-methoxycarbonylethoxide), samarium tris(2-N,N-dimethylaminoethoxide), dysprosium tris(2-N,N-dimethylaminoethoxide), yttrium (O-Vitamin D$_3$)$_3$ and (2,2,6,6-tetramethylhepta-3,5-dionate)$_2$MZ, wherein M is yttrium or a rare earth metal and Z is as defined above.

DETAILS OF THE INVENTION

The invention relates to a process for the ring opening polymerization of lactones using as catalysts compounds of yttrium and the rare earth metals, the living polymers produced by such a process, polymers with novel end groups, novel block copolymers comprising at least one poly(R-lactide) block and at least one poly(S-lactide) block, and novel yttrium and rare earth compounds useful as catalysts in the polymerization.

The lactones which can be used in the process of this invention include

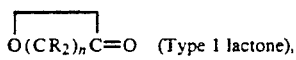  (Type 1 lactone),

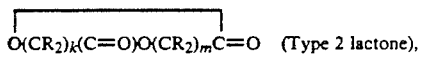  (Type 2 lactone), and

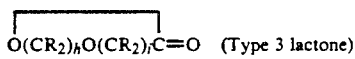  (Type 3 lactone)

wherein n is 4 or 5, h, i, k and m are independently one or two, and each R is independently chosen from H or hydrocarbyl containing up to 12 carbon atoms or substituted hydrocarbyl containing up to 12 carbon atoms. Preferred lactones are those in which R is hydrogen or methyl, and especially preferred lactones are ε-caprolactone, δ-valerolactone, lactide (3,6-dimethyl-1,4-dioxan-2,5-dione), glycolid (1,4-dioxan-2,5-dione), 1,5-dioxepan-2-one and 1,4-dioxan-2-one.

The catalysts for this polymerization are compounds of yttrium and the rare earth metals. Rare earth metals include those elements with atomic numbers 57 through 71, namely lanthanum, cerium, praseodymium, neodymium, promethium, samarium, europium, gadolinium, terbium, dysprosium, holmium, erbium, thulium, ytterbium and lutetium. Preferred metals are yttrium, lanthanum, erbium, samarium and dysprosium. Especially preferred are yttrium, lanthanum and mixtures of yttrium and rare earth metals that are obtained from the mining and smelting of rare earth metal ores. In all of the catalysts the yttrium and rare earth metal is trivalent. The catalyst should preferably be at least slightly soluble in the reaction medium The groups bonded to the metal are denoted Z, where Z is independently chosen from $-OCR^1_3$, $-NR^1_2$, and $-CR^1_3$, wherein each $R^1$ is independently chosen from hydrogen, hydrocarbyl and substituted hydrocarbyl. It is to be understood that in the grouping $-OCR^1_3$ the carbon atom bound to the oxygen may be part of a nonaromatic carbocyclic or nonaromatic heterocyclic ring formed from that carbon atom and two of the $R^1$ groups. Similarly, in the grouping $-NR^1_2$ the nitrogen may be part of a nonaromatic heterocyclic ring formed by the nitrogen atom and the two $R^1$ groups. In the grouping $-CR^1_3$, the carbon atom bound to the metal may be part of an aromatic and nonaromatic carbocyclic or aromatic and nonaromatic heterocyclic ring formed by that carbon atom and two of the $R^1$ groups. Alternatively, one or two of the $R^1$ groups in $-CR^1_3$ may be covalent bonds to carbon, forming vinylic and acetylenic groups, respectively. Preferred Z groups contain less than 50 carbon atoms or are biologically active, provided that when a Z group is biologically active, the 50 carbon atom limit does not apply. Especially preferred Z groups include 2-ethoxyethoxy, isopropoxy, 2-phenylthioethoxy, 2-N,N-dimethylaminoethoxy, 1-methoxycarbonylethoxy, trimethylsilylmethyl, N,N-bis(trimethylsilyl)amino, 4-hydroxymethylbenzyloxy and the alkoxide of Vitamin $D_3$.

It is understood that all of the above named Z groups bonded to yttrium or a rare earth metal can initiate polymerization, so that for each mole of catalyst ($MZ_3$) present, up to three polymer chains will be produced. However certain highly coordinating ligands, such as acetylacetonate and 2,2,6,6-tetramethylhepta-3,5-dionate do not initiate polymerization, so in order to be a catalyst, at least one of the groups bonded to yttrium and a rare earth metal must not be a highly coordinating ligand. Other highly coordinating ligands include fluoride, chloride, bromide, iodide, carboxylate, tetrasubstituted porphrinato(-2), phthalcyanato(-2), beta keto ester anions such as methyl acetoacetonate, dialkylmalonate anion, cyclopentadienide, pentamethylcyclopentadienide and aryloxide such as phenoxide. Such features are further illustrated in the Examples.

It will be understood by those skilled in the art that many of the compounds that are catalysts do not exist in simple monomeric form, but can be more highly coordinated or exist as "cluster compounds", or as "nonstoichiometric compounds". A review of yttrium and rare earth chemistry applicable to catalysts of the present invention is R. C. Mehrotra, P. N. Kapoor and J. M. Batwara, Chemical Reviews, Vol. 31, (1980), pp. 67-91. For a specific reference to the structure of yttrium alkoxides, see footnote 1 in D. C. Bradley et al Journal of the Chemical Society, Chemical Communications, Vol. 1988, pp. 1258-1259. It is understood that even if such compounds do not exist as simple $MZ_3$ species, such compounds where the yttrium or rare earth metal is trivalent are included within the meaning of active catalysts, and are included within the meaning of structure $MZ_3$ in this specification, as long as they have at least one group that is active in initiating polymerization, i.e., is not highly coordinating. An example of such a cluster compound is $Y_3[OC(CH_3)_2]_7Cl_2(THF)_2$ in W. J. Evans and M. S. Sollberger, Inorganic Chemistry, Vol. 27 (1988), pp. 4417–4423.

The formula $MZ_3$ is also meant to encompass "complex" salts of yttrium and rare earth metals such as $S_2MZ_7$, wherein M and Z have the meaning given above, and S is a divalent metal cation, such as barium. Thus the necessary elements in such a compound are trivalent yttrium or rare earth metal and one or more Z groups bound to them. Examples of such compounds are $Ba_2Y(OCH_2CH_2NMe_2)_7$ and $Ba_2Y(OCH_2CH_2OCH_2CH_3)_7$ (see Examples 42 and 43). Such complex salts may give broader molecular weight distribution polymers than, the "simple" $MZ_3$ compounds.

It will also be understood by those skilled in the art that if more than one type of Z group is present in a catalyst, or a mixture of two catalysts containing different Z groups is used, that "redistribution" reactions may take place (see Mehrotra et al. supra). By redistribution reactions is meant an exchange of Z groups between the metal atoms, so that it is possible, in theory, to obtain any combination of Z groups present on any particular metal atom.

By hydrocarbyl is meant any monovalent radical that contains only carbon and hydrogen. By substituted hydrocarbyl is meant any monovalent hydrocarbyl radical that contains other functional groups that do not substantially interfere with the reaction or react with any of the reactants or products. Suitable functional groups include halo, ester, ether, amino, thioether, silyl, hydroxy, carbon-carbon unsaturation (i.e., double or triple bonds) and aldehyde. Trivalent yttrium and rare earth compounds will not be stable if they contain a functional group whose pKa is less than that of the pKa of the conjugate acid of the functional group bound to the yttrium or rare earth metal. A special case may arise when the above two pKas are approximately equal.

Then an equilibrium may exist as to which group is bound to the yttrium or rare earth metal, and if such groups fit the definition of Z above, and are not highly coordinating, then both will initiate polymerization see Example 28.

Novel yttrium and rare earth metal compositions include yttrium tris(2-phenylthioethoxide), yttrium tris(1-methoxycarbonylethoxide), yttrium tris(2-N,N-dimethylaminoethoxide), samarium tris(2-N,N-dimethylaminoethoxide), dysprosium tris(2-N,N-dimethylaminoethoxide), yttrium (O-Vitamin $D_3$)$_3$ and (2,2,6,6-tetramethylhepta-3,5-dionate)$_2$MZ, wherein M is yttrium or a rare earth metal, and Z is —OCR$^1_3$, —NR$^1_2$ and CR$^1_3$ wherein R$^1$ is hydrogen, hydrocarbyl and substituted hydrocarbyl. By the grouping "(O-Vitamin$D_3$)" is meant the alkoxide of Vitamin $D_3$, whose structure is given in the Merck Index, Eighth Ed., Merck & Co., Rahway, 1968, pp. 1113-1114. Such compounds are useful as initiators for the polymerization of lactones.

In the case of alkoxide-metal initiators, it is believed the polymerization starts by the ring opening addition of the catalyst to the lactones yielding, corresponding to Types 1, 2, and 3 lactones respectively, (for simplicity it is assumed that all three metal bonded groups have initiated the reaction at the same time)

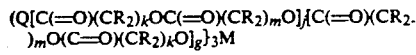

and

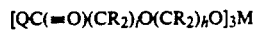

wherein n is 4 or 5, h, i, k and m are independently one or two, g and j are 0 or 1, g +j is 1, each R is independently chosen from H or hydrocarbyl containing up to 12 carbon atoms or substituted hydrocarbyl containing up to 12 carbon atoms, M is chosen from yttrium and the rare earth metals, and Q is —OCR$^1_2$ wherein each R$^1$ is independently chosen from hydrogen, hydrocarbyl and substituted hydrocarbyl. It is to be understood that in polymers formed from Type 2 lactones, including living and nonliving polymers, that the groups included within the brackets represented by [ ]q and [ ]r (infra) are randomly distributed through the polymer molecule due to the lactone ring opening at either of the ester groups within the lactone ring.

It is believed that the above structures and indeed all of the structures derived from all of the initiators of the present process can add additional monomer units to form higher molecular weight living polymers. These polymers can be defined as a lactone polymer wherein the living end consists essentially of a yttrium or rare earth metal alkoxide, the alkoxide being the terminal atom of a polylactone. It is understood that the terminal alkoxide oxygen atom is actually part of the last lactone monomer to be polymerized onto the polymer chain. Such living ended polymers can be reacted (polymerized) with more lactone. If it is the same lactone(s) as previously used, the molecular weight will simply be increased, but if a different lactone(s) is used, a block copolymer will be made. Thus, such living end polymers may be random or block copolymers, with subsequent adjustments to the structures shown. Random copolymers are made by simultaneous introduction of two or more lactone monomers into the polymerization, while block copolymers are made by sequential introduction of two or more lactone monomers into the polymerization. Some lactone monomers may be more reactive than others, so that random copolymers will not form. To form block copolymers of such monomer combinations, it may be necessary to add the monomers in a specific sequence. For example, to form a polylactide, polycaprolactone AB block copolymer, the caprolactone should be polymerized first. Such random and block copolymers are illustrated in the Examples. See Examples 7 and 8 for demonstrations of livingness, and Example 19 for a demonstration of the existence of the living end.

Polymers made in "living" polymerizations are usually characterized by having narrow molecular weight distributions, that is Mw/Mn (Mw is weight average molecular weight, Mn is number average molecular weight) close to or equal to one will be produced (but see time of reaction infra). The living ended polymer may be stored under inert conditions (infra) and then used to further polymerize the same or another lactone. As discussed (supra), trivalent yttrium and rare earth metal compounds (in this case alkoxides) may exist as complexes or cluster compounds, and the simplified formulas shown immediately above include such complexes and cluster compounds.

Especially preferred living ended polymers are those of the structures

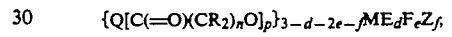

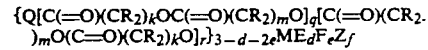

and

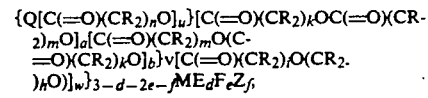

wherein n is 4 or 5; h, i, k and m are independently one or two; p is three or more; q and r are independently zero or an integer; e is 0 or 1; d is 0, 1 or 2; E is a monovalent highly coordinating ligand; F is a divalent highly coordinating ligand; Z is as defined above; providing that q+r are three or more; d+2e is 2 or less; d+2e+f is 0, 1 or 2 and f is 0, 1 or 2; a and b are independently zero or an integer, providing that a+b is one or more; each R is independently chosen from H or hydrocarbyl containing up to 12 carbon atoms or substituted hydrocarbyl containing up to 12 carbon atoms; M is chosen from yttrium and the rare earth metals; Q is —OCR$^1_3$, wherein each R$^1$ is independently chosen from hydrogen, hydrocarbyl and substituted hydrocarbyl; and u, v, and w are independently zero or integers, provided that at least two of u, v and w are not zero. It is to be understood either of the groups (CR)$_k$ or (CR)$_m$ may be in the a position to M or Q. The last formula represents a block or random copolymer of 2 or 3 types of lactones.

The polymerization process of the present invention may be carried out with or without solvent. The reactants and products should be at least slightly soluble in the reaction medium. Suitable solvents include aromatic hydrocarbons such as toluene, methylene chloride, N,N-dimethylformamide and tetrahydrofuran. The solvent should contain no active hydrogen whose pKa is less than or approximately equal to the pKa of the conjugate acid of the groups bound to the yttrium or rare earth metal of the catalyst.

The polymerization is run at from about −80 to +200° C. A preferred temperature is 0° to 110° C. Most preferred is ambient temperature or the boiling point of the solvent. For certain relatively unstable catalysts, maximum temperature may be less than 200° C., at least until the polymerization is under way.

It is preferred to use a dry inert gas such as nitrogen or argon to blanket the reaction. Moisture is deleterious to the stability of the catalyst and living end polymer. The starting materials should be dry. Drying methods are known to those skilled in the art, and include distillation from calcium hydride and passage over molecular sieves.

The polymerization process may be run in a variety of ways, for example, batch, continuous tubular or plug flow reactor (sometimes also called a "pipeline" reactor), continuous stirred tank reactor, semibatch, etc. Such reactors are well known in the art, see for example Kirk-Othmer Encyclopedia of Chemical Technology, 3rd Ed., Vol. 19, John Wiley & Sons, New York, 1982, pp, 880–914. By semibatch is meant a batch reaction to which one or more of the reactants is added as the reaction proceeds.

The reaction usually proceeds relatively quickly, and the Examples are further illustrative of this. As mentioned above, a narrow molecular weight distribution polymer is usually produced by this polymerization process., However, after the polymerization is over, the molecular weight distribution of the product polymer gradually becomes broader (Mw/Mn becomes larger), see Example 5. It is believed that the living end of the polymer can also cause transesterification of the polyester products, leading to the broader molecular weight distribution. Thus if narrow molecular weight distribution polymers or block copolymers are desired, the living ends should be destroyed promptly after the polymerization is over. Destruction can be accomplished by exposure of the living ends to water or acids.

After the polymerization is complete the polymer has a living end, so long as it is stored under inert conditions. However, for most purposes it is more useful to obtain the polymer without the living end. The metal may be removed by washing a solution of the living end polymer with an aqueous solution of complexing agent, such as acetylacetone, or ethylenediamine tetraacetic acid (ETDA), or a strong acid such as hydrochloric acid. Multiple washes may be needed to remove most of the metal. The polymer can then be isolated by removing the solvent by distillation or evaporation. If the presence of the metal is not objectionable, exposure of the polymer to moisture in the air will destroy the living end (yttrium and rare earth metal). These polymers are useful as molding resins, extruded films, fibers and in biocompatible and biodegradable drug delivery systems.

Also provided are novel polymers of the formula

T[C(=O)(CR₂)ₙO]ₚH,

T{[C(=O)(CR₂)ₖO(C=O)(CR₂)ₘO]q[C(=O)(CR₂)ₘO(C=O)(CR₂)ₖO]ᵣ}H

T(C(=O)(CR₂)ⱼO(CR₂)ₕOₚH

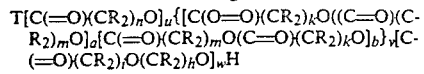

wherein n is 4 or 5; h, i, k and m are independently 1 or 2; a and b are independently zero or an integer, providing that a+b is one or more; u, v and w are independently zero or an integer, providing that at least two of u, v and w are not zero; q and r are independently zero or an integer, provided that q+r is one or more; R is H, hydrocarbyl containing up to about 12 carbon atoms, and substituted hydrocarbyl containing up to about 12 carbon atoms; and T is —OCR²₃, and each R² is independently hydrogen or substituted hydrocarbyl, providing that at least one of R² is not hydrogen. It is understood that either of the groups (CR)ₘ or (CR)ₖ may be in the a position to T. It is obvious to one skilled in the art that such polymers may be random or block copolymers, with subsequent adjustments to the structures shown. The last structure shown above can be a random or block copolymer. Random copolymers are made by simultaneous introduction of two or more lactone monomers into the polymerization, while block copolymers are made by sequential introduction of two or more lactone monomers into the polymerization. These polymers with terminal functional groups are useful as surfactants, controlled release agents for biologically active molecules and further functionalization of polymers. Preferred functions in the end groups are amino, alkyl and aryl thioethers, alkyl and aryl esters, alkyl and aryl ethers, and biologically active end groups. Biologically active end groups means that the end group is biologically active when attached to the polymer chain or when removed (by hydrolysis, for example) from the polymer chain. Especially preferred functions in end groups are amino, alkyl and aryl esters and biologically active end groups. An especially preferred combination is a biologically active end group on a biodegradable polymer, such as a Vitamin D₃ end group on polylactide.

Also provided are novel block copolymers comprising at least one block of poly(R-lactide) and at least one block of poly(S-lactide). Each block contains on average, at least 5 monomer units, preferably at least 50 monomer units. Such copolymers inherently form a stereocomplex, the stereocomplex being described in U.S. Pat. Nos. 4,710,246, 4,766,182 and 4,800,219 (which are hereby incorporated by reference) as being formed from a polymer containing a poly(R-lactide) segment and another polymer containing a poly(S-lactide) segment. The stereocomplex is especially useful in biodegradable prosthetic devices, as described in the aforementioned patents. The blocks of poly(R-lactide) and poly(S-lactide) may contain up to about 20 mole percent of comonomers, which for a poly(R-lactide) block may include S-lactide, and vice versa. It is preferred that the comonomers be no more than 10 mole percent of the block, and especially preferred that the comonomers be no more than 5 mole percent of the block. It is p referred that the poly(R-lactide) and poly(S-lactide) blocks be of approximately the same molecular weight. It is also preferred that the block copolymer contain only blocks of poly(R-lactide) and poly(S-lactide), and especially preferred that the polymer molecule contains the same number of blocks of poly(R-lactide) and poly(S-lactide).

In the Examples the following catalysts were made or bought using procedures in the references listed or supplied by the supplier listed with them: yttrium triisopropoxide, samarium triisopropoxide, lanthanum triisopropoxide and dysprosium triisopropoxide bought from Strem Chemicals; erbium triisopropoxide, L. M. Brown, Inorganic Chemistry, Vol. 9 (1970), p. 2783; yttrium tris(1,1,1,3,3,3-hexamethyldisilylamide), D. C. Bradley, Journal of the Chemical Society, Dalton Transactions, Vol. 1973, p. 1021; Y(CH$_2$SiMe$_3$)$_3$(THF)$_2$, M. F. Lappert, Journal of the Chemical Society, Chemical Communications, Vol. 1973, p. 126. The synthesis of all other catalysts are in the Examples.

In the Examples, the following abbreviations are used:

DSC—differential scanning calorimetry
GPC—gel permeation chromatography
IR—infrared (spectroscopy)
Mn—number average molecular weight
mp—melting point
Mw—weight average molecular weight
NMR—nuclear magnetic resonance spectroscopy
PD—polymer polydispersity, numerically Mw/Mn
PET—poly(ethylene terephthalate)
PMMA—poly(methyl methacrylate)
PS—polystyrene
RB—round bottomed
STD—standard
THF—tetrahydrofuran
Tm—melting temperature (determined by DSC)
UV—ultraviolet spectroscopy A note on the GPC data—several standards have been used in the calibration of the GPC data, and since none of these calibrations are for the polymers actually measured, the absolute values of Mn and Mw may be incorrect. However, comparisons can be made between GPC determinations on the same polymer compositions using the same standard.

EXAMPLE 1

Low Temperature Polymerization of ε-Caprolactone with Lanthanum Triiospropoxide

To an oven dried 100 ml. RB flask equipped with a stirring bar and under a dry inert atmosphere were added toluene (40 ml.) and ε-caprolactone (5.35 g). The resulting solution was cooled to −64° C. (liquid nitrogen/chloroform slush bath), then lanthanum triisopropoxide (1.0 ml. of a 0.08 M solution in toluene) was added. Within 2 minutes a white precipitate formed. After five minutes the polymerization was terminated with 5% HCl (50 ml.). After isolation and drying, 4.52 g (84.5% yield) of polymer was obtained. GPC analysis: Mn =16800, Mw =70200, PD =4.18 (PMMA STD.).

EXAMPLE 2

High Temperature Polymerization of ε-Caprolactone with Lanthanum Triisopropoxide To an oven dried 100 ml. RB flask equipped with a reflux condenser, stirring bar and under a dry inert atmosphere were added toluene (40 ml.) and ε-caprolactone (5.34 g). The resulting solution was heated to 110° C. (refluxing toluene). Lanthanum triisopropoxide (1.0 ml. of a 0.08 M solution in toluene) was then added to the hot stirred solution. Polymerization was terminated after two minutes with 5% HCl (50 ml.). After isolation and drying, 4.17 g (78.0% yield) of polymer was obtained. GPC analysis: Mn =7950, Mw =77800, PD =9.79 (PMMA STD.).

EXAMPLE 3

Room Temperature Polymerization of ε-Caprolactone with Lanthanum Triisopropoxide To an oven dried 100 ml. flask equipped with a stirring bar and under a dry inert atmosphere were added toluene (40 ml.) and ε-caprolactone (5.42 g). To the resulting stirred solution lanthanum triisopropoxide (1.0 ml. of a 0.08 M solution in toluene) was added. After four minutes the polymerization was quenched with 5% HCl (50 ml.). The separated organic phase was again washed with 5% HCl (2×50 ml.) and then with water 3×50 ml.). After drying over anhydrous sodium carbonate and filtering the organic phase was concentrated at reduced pressure. The polymer was precipitated in hexanes, then filtered and dried under vacuum. Yield: 5.20 g (95.9%). GPC analysis: Mn =15600, Mw =101000, PD =6.47 (PMMA STD.).

EXAMPLE 4

Polymerization of ε-Caprolactone to High Molecular Weight with Yttrium Triisopropoxide To an oven dried 100 ml. RB flask containing toluene (400 ml.), and equipped with a stirring bar and under argon was added ε-caprolactone (65.2 g). Yttrium triisopropoxide (0.5 ml. of an 0.2 M solution in toluene) was added to the stirred solution. After one half hour no polymerization was apparent. An additional 0.5 ml. was added. Again, no polymerization occurred. A third 0.5 ml. of yttrium triisopropoxide was added. Within minutes the solution thickened. The polymerization was quenched after one hour with 5% HCl (100 ml.). After thoroughly mixing 5% sodium bicarbonate (100 ml.) was added. The separated organic phase was then washed with water (2×100 ml.). The polymer was precipitated in hexanes, filtered and dried under vacuum at 45° C. Yield: 54.5 g (83.6%). GPC analysis: Mn =101,000, Mw =142,000, PD =1.42 (PMMA STD.), Mn =84,400, Mw =102,000, PD =1.22 (PS STD.).

EXAMPLE 5

Polymerization of ε-Caprolactone with Erbium Triisopropoxide, Effect of Time of Polymerization To four separate oven dried 100 ml. RB flasks equipped with stirring bars and under argon were added toluene (40 ml.) and ε-caprolactone (5.4 g). Erbium triisopropoxide (0.5 ml. of an 0.2 M solution in toluene) was added to each flask. After 5 minutes, 15 minutes, 2 hours and 6 hours, a polymerization was terminated with 5% HCl (50 ml.). The resulting organic phases were separated and again washed with 5% HCl (2×50 ml.), then with 5% sodium bicarbonate. The polymers were precipitate in hexanes, filtered and dried under vacuum. Polymer yields and GPC analysis:

| Polymer Time | Polymer Yield (%) | Mn (PS STD) | Mw (PS STD) | PD | Mn (PMMA STD) | Mw (PMMA STD) | PD |
|---|---|---|---|---|---|---|---|
| 5 mins. | 99.6 | 33000 | 36500 | 1.16 | 30700 | 40600 | 1.32 |
| 15 mins. | 98.7 | 29600 | 43900 | 1.47 | 23700 | 46500 | 2.06 |
| 2 hrs. | 94.5 | 26700 | 57200 | 2.14 | 19100 | 71200 | 3.73 |
| 6 hrs. | 91.0 | 22300 | 53600 | 2.40 | 15500 | 65500 | 4.22 |

EXAMPLE 6

Preparation of AB Block Polymer of S and R-Lactides with Yttrium Tris(2-N,N-dimethylaminoethoxide): Ratio of S:R = 3:1

In a dry box, S-Lactide (7.469 g) and R-lactide (2.529 g) were weighed in separate oven dried 100 ml. flasks equipped with stirring bars. Methylene chloride was then added (40 ml. to the S-lactide and 20 ml. to the R-lactide) under argon. After the lactides had dissolved, yttrium tris(2-N,N-dimethylaminoethoxide) (0.5 ml. of an 0.2 M solution in toluene) was added to the stirred S-lactide solution. After 20 minutes the R-lactide/methylene chloride solution was added via syringe to the polymerized S-lactide solution. After 1.5 hours, the polymerization was terminated with 5% HCl (50 ml.). Additional methylene chloride was added to the resulting emulsion. After making slightly basic with 5% sodium bicarbonate, the organic phase was separated and dried over anhydrous sodium sulfate. After filtration, the solvent was removed at reduced pressure and the resulting polymer dried under vacuum. The dried polymer was placed in a blender and washed with methanol (2×500 ml.), filtered and again dried under vacuum, affording 10.1 g of polymer. GPC analysis: Mn =75,000, Mw =250,000, PD =3.33 (PET STD.). DSC analysis: Tm =202.5° C. The high mp shows the presence of stereocomplex.

EXAMPLE 7

AB Block Polymer of ε-Caprolactone and S-Lactide: Catalyst Yttrium Tris(2-N,N-dimethylaminoethoxide)

ε-Caprolactone (4.08 g) and S-lactide (2.50 q) were weighed in separate oven dried 100 ml. flasks equipped with stirring bars and under a dry inert atmosphere. Methylene chloride (20 ml.) was added to each flask. Yttrium tris(2-N,N-dimethylaminoethoxide) (2.0 ml. of an 0.1 M solution in toluene) was added to the stirred ε-caprolactone/methylene chloride solution. After 14 mins., methylene chloride (20 ml.) was added to the polymerized solution, then a 20 ml. aliquot of the polymerized solution was withdrawn. The polymer was isolated from this solution via washing with 5% HCl, 5% sodium bicarbonate and water. The solvent was removed at reduced pressure and the resulting polymer dried under vacuum affording 1.73 g of polymer. After washing in a blender with methanol and drying under vacuum, 1.62 g (93.6%) of polymer was obtained. GPC analysis: Mn =20,400, Mw =28,800, PD =1.41 (PMMA STD.), Mn =23,100, Mw =28,800, PD =1.25 (PS STD.). The S-lactide/methylene chloride was added to the remaining polymerized ε-caprolactone solution (14 mins. after the initial polymerization of the ε-caprolactone). After 0.5 hr. the polymerization was quenched with 5% HCl (50 ml.), then 5% sodium bicarbonate added (100 ml.) together with water. The separated organic phase was dried over anhydrous sodium carbonate. After filtration, the filtrate was concentrated at reduced pressure and then dried under vacuum affording 4.69 g of polymer. After washing with methanol in a blender and drying under vacuum, 4.44 g (94.6%) of polymer was obtained. GPC analysis: Mn =23,700, Mw =37,900, PD =1.60 (PMMA STD.), Mn =26,300, Mw =35,700, PD =1.36 (PS STD.). Total yield (homopolymer and block polymer) TM 94.3%.

EXAMPLE 8

Semibatch Polymerization of ε-Caprolactone with Yttrium Triisopropoxide

To an oven dried 250 ml. RB three neck flask equipped with a stirring bar and a nitrogen bleed and all other openings closed with rubber septa were added toluene (60 ml.) and yttrium triisopropoxide (0.5 ml. of an 0.5 M solution in toluene). ε-Caprolactone (10.4 g) was loaded into an oven dried 10 ml. syringe; this was attached to a syringe pump. The ε-caprolactone was added at a rate of 1 ml. per 10 minutes to the stirred solution. After 3.5 ml. of ε-caprolactone was added (35 minutes), approximately 13 ml. of the polymerization solution was withdrawn via syringe. This was added to 5% HCl. The separated organic phase was again washed twice with acid and finally with water. After drying (anhydrous sodium carbonate) and filtration the solvent was removed via rotoevaporation. The resulting polymer was dried under vacuum. Yield: 1.05 g. GPC analysis: Mn =8520, Mw =13,900, PD =1.64 (PMMA STD.).

After an additional 30 minutes (approximately 3.0 ml. of additional ε-caprolactone added) 15 ml. of the reaction solution was withdrawn via syringe and worked up a described above. Yield of isolated polymer: 1.70 g. GPC analysis: Mn =19,200, Mw =27,200, PD =1.41 (PMMA STD.).

After the final addition of ε-caprolactone (approximately 40 minutes from last sample withdrawal) polymerization was allowed to continue for one hour. Then the polymerization was quenched with 5% HCl and the polymer isolated as described above. Yield 7.30 g. GPC analysis: Mn =27,600, Mw =67,400, PD =2.44 (PMMA STD.). Total yield =10.05 g (96.6%).

EXAMPLE 9

Polymerization cf ε-Caprolactone with Yttrium Triisopropoxide in Tetrahydrofuran

Tetrahydrofuran (40 ml.) and ε-caprolactone (6.01 g) were added to an oven dried 100 ml. flask equipped with a stirring bar and a nitrogen bleed. Yttrium triisopropoxide (0.25 ml. of an 0.5 M solution in toluene) was added to the stirred solution at room temperature. After three hrs., the reaction was terminated by pouring the polymerized solution into a mixture of toluene (200 ml.) and 5% HCl (50 ml.). The separated organic phase was again washed with 5% HCl (2×50 ml.) and then water (3×50 ml.). The separated organic phase was dried over anhydrous sodium carbonate. After filtration the filtrate was concentrated at reduced pressure and the resulting polymer dried under vacuum. Yield: 5.81 g (96.5%). GPC analysis: Mn =18,000, Mw =70,200, PD =3.90 (PMMA STD.).

EXAMPLE 10

Polymerization of ε-Caprolactone with Yttrium Triisopropoxide in Dimethylforamide

ε-Caprolactone (6.57 g) and dimethylforamide (40 ml.) were added to an oven dried 100 ml. RB flask equipped with a stirring bar and a nitrogen bleed. Yttrium triisopropoxide (0.5 ml. of an 0.5 M solution in toluene) was added to the stirred solution at room temperature. After one hour the polymerization solution was poured into a mixture of toluene (100 ml.) and 5% HCl (50 ml.). The separated organic phase was again washed with 5% HCl (2×50 ml.) and then water (2×50 ml.). After drying over anhydrous sodium carbonate and filtering, the filtrate was concentrated at reduced pressure. The resulting polymer was then dried under vacuum. Yield: 3.31 g (50.43%). Mn =3538 (calculated via end group analysis), Mn (theoretical) =4413 based on polymer yield.

EXAMPLE 11

Polymerization of $\epsilon$-Caprolactone with Yttrium Triisopropoxide $\epsilon$-Caprolactone (3.0 ml.) and toluene were added to an oven dried 100 ml. RB flask equipped with a stirring bar and a nitrogen bleed. Yttrium triisopropoxide (0.5 ml. of an 0.5 M solution in toluene) was added to the resulting solution. After 2.5 hrs. an additional 3.0 ml. of $\epsilon$-caprolactone was added to the polymerized solution. After an additional 2 hrs. the polymerization was quenched with 2.5% HCl (50 ml.). Toluene (50 ml.) was added, the organic phase separated and again washed with 2.5% HCl (2×50 ml.) and then with water (2×50 ml.). The organic phase was dried over anhydrous sodium carbonate. The filtered organic solution was concentrated at reduced-pressure and the resulting polymer dried under vacuum. Yield: 6.21 g (99.5%). GPC analysis: Mn =5380, Mw =16,400, PD =3.04 (PMMA STD.).

EXAMPLE 12

Polymerization of $\epsilon$-Caprolactone with Yttrium Tris(2-ethoxyethoxide)

Toluene (40 ml.) and $\epsilon$-caprolactone (7.88 g) were added to a oven dried 100 ml. RB flask equipped with a stirring bar and nitrogen bleed. Yttrium tris(2-ethoxyethoxide) (0.5 ml. of an 0.2 M solution in toluene) was added to the stirred solution at room temperature. After five minutes the polymerization was terminated with 40 ml. of 2.5% HCl. The resulting mixture was transferred to a separatory funnel and the organic phase separated. The organic phase was again washed with 2.5% HCl (2×50 ml.), then water (3×50 ml.). The polymer was precipitated in hexanes, then filtered and dried under vacuum. Yield: 7.2 g (91.3%). GPC analysis: Mn =47,300, Mw =52,100, PD =1.10 (PS STD.); Mn =49,500, Mw =58,200, PD =1.17 (PMMA STD.).

EXAMPLE 13

Polymerization of $\epsilon$-Caprolactone with Yttrium Tris(2-N,N-dimethylaminoethoxide)

End Groups Analysis $\epsilon$-Caprolactone (3.85 g) and toluene (30 ml.) were added to 100 ml RB flask equipped with a stirring bar and an argon bleed. Yttrium tris(2-N,N-dimethylaminoethoxide) (10 ml. of an 0.053 M solution in toluene) was added to the stirred reaction solution. After three hours the polymerization was quenched via the addition of 5% HCl (50 ml.). Sodium bicarbonate solution (5%, 100 ml.) was added to the resulting emulsion. This polymer was filtered and dried under vacuum. Yield: 3.1 g (80%). 1H NMR (CDCl$_3$)$\delta$6 4.25 (t, N—C—CH$_2$O, J =5 Hz), 4.1 (t, (CO$_2$CH$_2$)$_n$, J =9 Hz), 3.65 (t, CH$_2$OH, J =9 Hz), 2.7 (t, NCH$_2$, J =5 Hz), 2.4 (s, Me$_2$N), 2.3 (t, (CH$_2$CO$_2$)$_n$, J =9 Hz), 1.65 (m, (CH$_2$—C—CH$_2$)$_n$), 1.4 (m, (C—CH$_2$—C)$_n$). Based on NMR results, end group analysis indicates Mn =2176, theoretical Mn =2038 based on polymer yield.

The above polymer (1.02 g) and dichloromethane (10 ml.) were added to an oven dried 100 ml. RB flask. To this stirred solution, 0.5 g anhydrous sodium sulfate and 0.5 ml. of dimethyl sulfate were added. After one and a half hours the sodium sulfate was filtered off and the resulting solution added to hexanes. The precipitated polymer was filtered and dried in vacuo. Yield: 0.7 g (70%); 1H NMR (CDCl$_3$) $\delta$3.4 (s, Me$_3$N+).

EXAMPLE 14

Polymerization of $\epsilon$-Caprolactone with Yttrium Bis(2,2,6,6-tetramethylheptanedionate)isopropoxide $\epsilon$-Caprolactone (5.32 g) and toluene (40 ml.) were added to a dried 100 ml. RB flask equipped with a stirring bar and an argon bleed. Yttrium bis(2,2,6,6-tetramethylheptanedionate)isopropoxide (8.0 ml. of a 0.04 M solution in toluene) was added to the stirred reaction solution. After six hours at room temperature the reaction was quenched with 50 ml. of 5% HCl. The organic phase was separated and again washed with 5% HCl (2×50 ml.), then water (3×50 ml.) and finally dried over sodium carbonate. The solution was filtered and concentrated via rotoevaporation, then added to 700 ml. of hexanes. The precipitated polymer was filtered and dried under vacuum. Yield: 5.1 g (97.7%) GPC analysis: Mn =27,700, Mw =32,200, PD =1.16 (PS STD.): Mn =24,400, Mw =31,300, PD =1.28 (PMMA. STD.).

EXAMPLE 15

Polymerization of $\epsilon$-Caprolactone with Y(CH$_2$SiMe$_3$)$_3$.(THF)$_2$ $\epsilon$-Caprolactone 5.51 g, and 40 ml. of toluene were added to an oven dried 100 ml. RB flask equipped with a stirring bar and an argon bleed. Then, Y(CH$_2$SiMe$_3$)$_3$.(THF)$_2$(1.0 ml. of a 0.1 M solution in toluene) was added to the stirred solution. Within 5 seconds there was an immediate increase in viscosity and temperature, with the reaction solution becoming clear yellow in color. After 30 minutes, the reaction was quenched with 50 ml. of 5% HCl. The separated organic phase was again washed with 5% HCl (2×50 ml.) then with water (3×50 ml.). The organic phase was dried over sodium carbonate, then filtered. The filtrate was concentrated, then poured into 800 ml. of hexanes. The precipitated polymer was filtered and dried in vacuum at 45° C. Yield: 4.75 g (86.2%). GPC analysis: Mn =37,400, Mw =87,500,PD =2.29 (PS STD.).

EXAMPLE 16

Polymerization of $\epsilon$-Caprolactone with Samarium Triisopropoxide $\epsilon$-Caprolactone (5.40 g) and 40 ml. of toluene were added to a 100 ml. RB flask equipped with a stirring bar and an argon bleed. After thoroughly mixing, samarium triisopropoxide (1.0 ml. of a 0.1 M solution in toluene) was added. After 30 minutes at room temperature, the polymerization was quenched with 50 ml. of 5% HCl. The separated organic phase was washed two more times with 50 ml. of 5% HCl, then water (3×50 ml.) The separated organic phase was dried over anhydrous sodium sulfate. After filtration, the polymer was isolated via precipitation in hexanes, filtered and dried under vacuum. Yield: 4.8 g (88.8%). Theoretical Mn =18,066. GPC analysis: Mn =38,400, Mw =58,900, PD =1.53 (PS STD.); Mn =34,600, Mw =72,500, PD =2.10 (PMMA STD.); Mn =17,500, Mw =34,800, PD =1.96 (Universal Calibration).

EXAMPLE 17

Polymerization of ε-Caprolactone with Yttrium (O-Vitamin D3)3

To an oven dried 100 ml. flask equipped with a stirring bar and an argon bleed were added toluene (30 ml.) and ε-caprolactone (5.4 g). Yttrium (O-Vitamin D3)3 (8.0 ml. of an 0.05 M solution in toluene) was added to the stirred solution. The reaction was quenched after 30 minutes with water (50 ml.). This mixture was then added to hexanes (800 ml.). The precipitated polymer was filtered and dried under vacuum at 45° C. Yield: 5.1 g (94.4%). GPC analysis: Mn =9030, Mw =17800, PD =1.98 (PMMA STD.). UV analysis (end group): Wavelength (max) =275 nm; calculated Mn from UV analysis =5300; calculated degree of polymerization (DP) =43 (theoretical DP =40).

EXAMPLE 18

Preparation of AB Block Polymer of S and R-Lactide (Ratio 1:1) with Samarium Tris(2-N,N-dimethylaminoethoxide)

In a dry box, S-lactide (5.02 g) and R-lactide (5.31 g) were weighed in separate 100 ml. flasks, equipped with stirring bars. Methylene chloride (40 ml.) was added to both flasks. After the lactides had dissolved, samarium tris(2-N,N-dimethylaminoethoxide) (1.00 ml. of an 0.105 M solution in toluene) was added to the stirred S-lactide solution under argon. After 15 mins. the R-lactide solution was added to the polymerized S-lactide solution. After an additional 30 mins. the polymerization was quenched with 5% HCl (50 ml.). Additional methylene chloride was added and the separated organic phase was again washed with 5% HCl. Sodium bicarbonate (5%, 2×50 ml.) was added together with water. The separated organic phase was dried over anhydrous sodium carbonate. After filtration, the organic solvent was removed at reduced pressure and the resulting polymer dried under vacuum. The dried polymer was washed with methanol (2×500 ml.) in a blender. The filtered polymer was dried under vacuum. Yield: 9.3 g (90.0%). GPC analysis: Mn =52100, Mw =95400, PD =1.832 (PET STD.).

EXAMPLE 19

Detection of Living Polymerization by $^1$N HMR Yttrium Bis(2,2,6,6-tetramethylheptane-3,5-dionate)isopropoxide and ε-Caprolactone All NMR samples were prepared in a nitrogen filled dry box.

Two molar equivalents of ε-caprolactone (0.027 g) were added to a solution of yttrium bis(2,2,6,6-tetramethylheptane-3,5-dionate)isopropoxide in $C_6D_6$ (2.00 ml., 0.060 M). $^1$H NMR after 1 hour showed that 68% of the catalyst was unreacted. The remaining catalyst had reacted with all of the ε-caprolactone monomer to form living polymer. Ten molar equivalents of additional ε-caprolactone (0.068 g) was added to 1.00 ml. of this solution and the $^1$H NMR spectrum was recorded after 1 hour. All of the catalyst and all of the ε-caprolactone had reacted to produce living polymer. Two of the $CH_2$ resonances of the monomer unit at the Y end of the polymer were well resolved triplets. Two of the remaining three $CH_2$ resonances can be observed as multiplets (see figure for peak assignments). When the polymer chain is cleaved from the Y catalyst by the addition of 2 molar equivalents of 2,2,6,6-tetramethylheptanedione, the $CH_2$ resonances characteristic of the living polymer disappear and a $CH_2$ resonance for the free polymer end $HOCH_2$—appears.

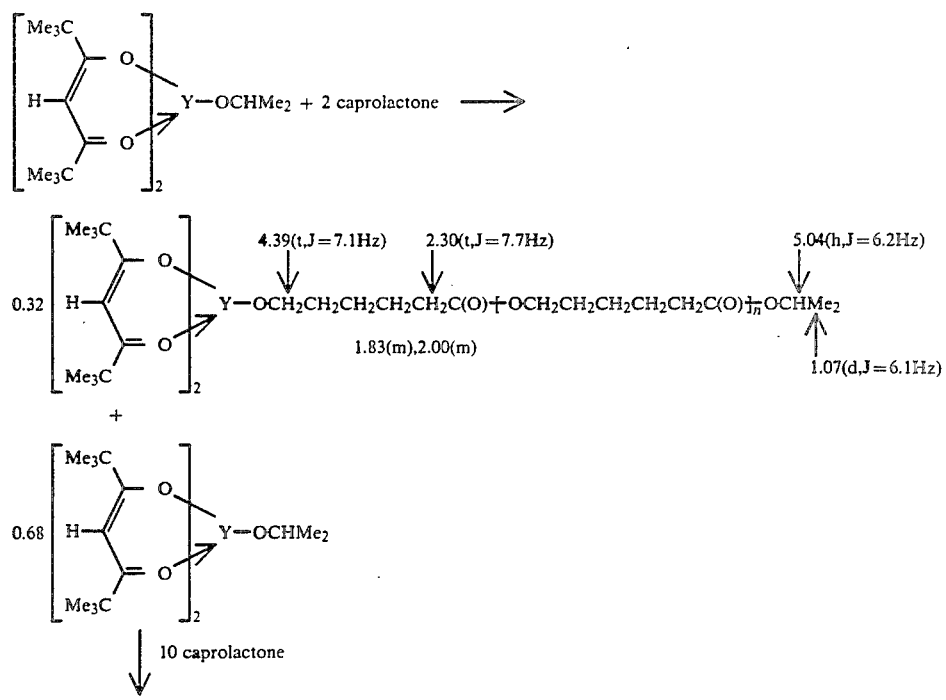

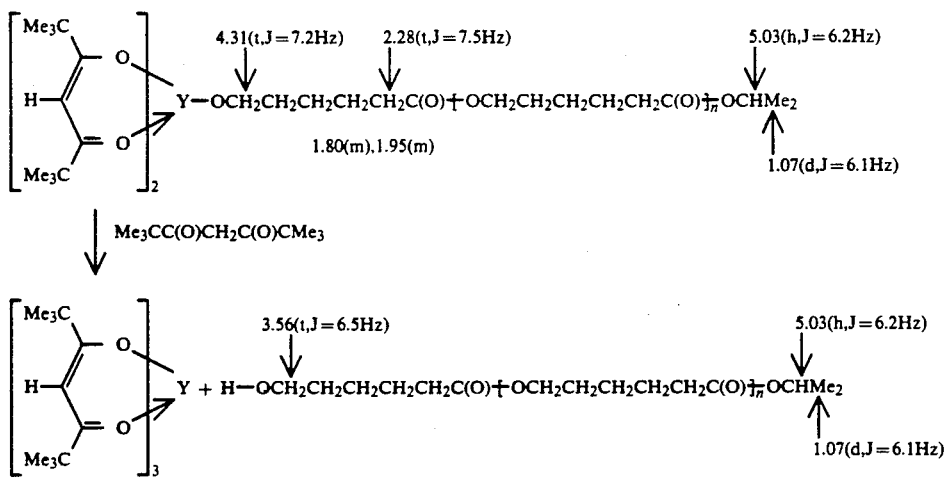

EXAMPLE 20

Preparation of AB Block Polymer of S and R-Lactides with Yttrium Tris(2-N,N-dimethylaminoethoxide): Ratio of S:R = 1:1

In a dry box, S-lactide (5.05 g) and R-lactide (5.05 g) were weighed in separate oven dried 100 ml. RB flasks, equipped with stirring bars. Methylene chloride (30 ml.) was added to both flasks under argon. After the lactides had dissolved, yttrium tris(2-N,N-dimethylaminoethoxide) (0.5 ml. of a 0.2 M solution in toluene) was added to the stirred S-lactide solution. After twenty minutes the R-lactide/methylene chloride solution was added to the polymerized S-lactide solution. Polymerization was continued an additional one and a half hours, then quenched with 50 ml. of 5% HCl. Additional methylene chloride was added to the resulting emulsion, then made slightly basic with 5% sodium bicarbonate. The organic phase was separated and dried over anhydrous sodium sulfate. The polymer was precipitated in hexanes, then filtered and dried under vacuum. Yield: 9.9 g. The polymer was placed in a blender and washed with methanol (2×500 ml.). The resulting polymer was filtered and dried under vacuum. Yield: 9.8 g (97%). GPC analysis: Mn =76,100, Mw =218,000, PD =2.88 (PET STD.). DSC analysis: Tm =217.4° C. The high melting point shows the presence of stereocomplex.

EXAMPLE 21

Polymerization of R-Lactide with Yttrium Tris(methyl S-Lactate)

In a dry box, R-lactide (5.05 g) was weighed in a 100 ml. RB flask equipped with a stirring bar. Methylene chloride (40 ml.) was added. To the stirred solution, under nitrogen, yttrium tris(methyl S-lactate) (1.0 ml. of a 0.1 M solution in methylene chloride) was added. After two and a half hours polymerization was terminated with 50 ml. of 5% HCl. Additional methylene chloride was added and the separated organic phase was again washed with 5% HCl (2×50 ml.), then with sodium bicarbonate (5%, 50 ml.) and finally with water (3×50 ml.). After drying over anhydrous sodium sulfate, the filtered organic solution was concentrated via rotoevaporation. The polymer was precipitated in hexanes and filtered, then dried under vacuum. Yield 4.65 g (92%). GPC analysis: Mn =85000, Mw=b 98800, PD =1.19 (PET STD.).

EXAMPLE 22

Polymerization of S-Lactide with Dysprosium Tris(2-N,N-dimethylaminoethoxide)

In a dry box, S-lactide (7.60 g) was weighed in a 100 ml. RB flask equipped with a stirring bar. Methylene chloride (40 ml.) was added. To the stirred solution, under argon, dysprosium tris(2-N,N-dimethylaminoethoxide) (1.0 ml. of a 0.1 M solution in toluene) was added. After approximately twenty-one hours, the polymerization was terminated with 50 ml. of 5% HCl. Additional methylene chloride was added and the organic phase separated and washed again with 5% HCl (2×50 ml.), then with 50 ml. of 5% sodium bicarbonate and finally with water (3×50 ml.). After drying over anhydrous sodium sulfate and filtration the organic phase was concentrated via rotoevaporation. The polymer was precipitated in hexanes and dried under vacuum. Yield: 5.15 g (67.7%). GPC analysis: Mn =70700, Mw =82,900, PD =1.17 (PET STD.).

EXAMPLE 23

Preparation of ABC Block Polymer of S, SR and R-Lactides

In a dry box, S-lactide (3.37 g), SR-lactide (3.30 g) and R-lactide (3.30 g) were weighed into separate oven dried 100 ml. RB flasks equipped with stirring bars. Methylene chloride (20 ml.) was added to each flask. After the lactides had dissolved, under argon, yttrium tris(2-N,N-dimethylaminoethoxide (0.5 ml. of a 0.2 M solution in toluene) was added to the stirred S-lactide solution at room temperature. After fifteen minutes the SR-lactide solution was added to the polymerized lactide. After an additional fifteen minutes the R-lactide solution was added to the polymerized S and SR-lactides. After thirty minutes the polymerization was terminated with 50 ml. of 5% HCl. Additional methylene chloride was added. After washing with 5% HCl, 50 ml. of 5% sodium bicarbonate was added followed by water (200 ml.). The separated organic phase was dried over anhydrous sodium sulfate. After filtration, the solution was concentrated at reduced pressure. The polymer was precipitated in hexanes, filtered and dried under vacuum at 50° C. The resulting polymer was washed with methanol (2×500 ml.) in a blender. After filtration the polymer was dried under vacuum. Yield: 10.05 g. GPC analysis: Mn =100000, Mw =149,000, PD =1.49 (PET STD.). Tm =211.5° C., which illustrates the presence of stereocomplex.

EXAMPLE 24

Polymerization of $\epsilon$-Caprolactone with Yttrium Tris(2-phenylthioethoxide)

$\epsilon$-Caprolactone (5.39 g) and toluene (40 ml.) were added to an oven dried 100 ml. flask equipped with a stirring bar and a nitrogen bleed. Yttrium tris(2-phenylthioethoxide) (3 ml. of a 0.037 M solution in toluene) was added to the stirred solution at room temperature. The polymerization was terminated with 50 ml. of 5% HCl. Additional toluene was added and the separated organic phase again washed with 5% HCl (2×50 ml.) then with 5% sodium bicarbonate (50 ml.) and finally with water (3×50 ml.). After drying over anhydrous sodium sulfate and filtration, the organic phase was concentrated at reduced pressure. The polymer was precipitated in hexanes, filtered and dried under vacuum. Yield: 5.1 g. GPC analysis: Mn =36,400, Mw =54,600, PD =1.50 (PMMA STD.); Mn =38,100, Mw =48,000, PD =1.26 (PS STD.); Mn =14,900, Mw =24,900, PD =1.67 (Universal Calibration).

EXAMPLE 25

Polymerization of S-Lactide with Yttrium Tris-(1,1,1,3,3,3-Hexamethyldisilylamide)

S-Lactide (4.70 g) was weighed in an oven dried 100 ml. RB flask equipped with a stirring bar in a dry box. Methylene chloride (40 ml.) was added. To the stirred solution, under argon, at room temperature, yttrium tris(1,1,1,3,3,3-hexamethyldisilylamide) (10 ml. of a 0.02 M solution in toluene) was added. After one and a half hours the polymerization was terminated with 50 ml. of 5% HCl. Sodium bicarbonate (5%, 50 ml.) was added and the resulting mixture added to hexanes. The precipitated polymer was filtered and dried under vacuum at 45° C. Yield: 3.8 g (80.8%). GPC analysis: Mn =59,500, Mw =187,000, PD =3.15 (PET STD.).

EXAMPLE 26

Polymerization of $\delta$-Valerolactone with Yttrium Triisopropoxide

To an oven dried 100 ml. flask equipped with a stirring bar and a nitrogen bleed, $\delta$-valerolactone (8.17 g) and toluene (40 ml.) were added. Yttrium triisopropoxide (0.25 ml. of a 0.5 M solution in toluene) was added to the stirred solution. After three hours, the reaction was quenched with 50 ml. of 5% HCl. Additional toluene was added and the separated organic phase was washed again with 5% HCl (2×50 ml.) then with water (3×50 ml). The organic phase was dried over sodium carbonate, then filtered and the toluene removed at reduced pressure. Hexanes were added to the resulting viscous solution, which precipitated the polymer. The resulting polymer was dried under vacuum. GPC analysis: Mn =25,600, Mw =35,200, PD =1.37 (PMMA STD.).

EXAMPLE 27

Polymerization of Glycolide with Yttrium Triisopropoxide

Glycolide (5.1 g) was weighed in an oven dried 100 ml. flask equipped with a stirring bar and a nitrogen bleed. N,N-Dimethylformamide (40 ml.) was added via syringe. The resulting mixture was stirred until the glycolide had dissolved. Yttrium triisopropoxide (0.5 ml) of a 0.2 M solution in toluene was added to the resulting solution at room temperature. After one hour a white precipitate formed. Polymerization was continued for approximately 16 hours, then the reaction mixture was poured into 500 ml. of methanol. The polymer was filtered and dried under vacuum. Yield: 3.0 g (58.8%). GPC analysis: Mn =5330, Mw =12,700, PD =2.28 (PET STD.)

EXAMPLE 28

Polymerization of $\epsilon$-Caprolactone with Yttrium Tris-(4-hydroxymethylbenzyloxide)

A solution of $\epsilon$-caprolactone, 2.04 g in 20 ml. of toluene, was added to a 100 ml. oven dried flask in a dry box. The 5 ml. of the catalyst suspension (see Example 33) was added by syringe. After 30 mins. the reaction was quenched by the addition of 50 ml. of 5% aqueous HCl. The solution was washed with 3×50 ml. of 5% aqueous HCl and 3×50 ml. of water. The resulting organic phase was dried over sodium carbonate. The sodium carbonate was removed by filtration and the solvent removed in vacuo. The resulting polymer was dried under vacuum overnight, yielding 2.07 g (101%) of product.

$^1$H NMR analysis of the polymer end groups ($C_6D_6$, 300 MHz) shows a single major resonance for the —C(O)OCH$_2$—$_p$—C$_6$H$_4$—CH$_2$OC(O)—groups derived from the 1,4-benzenedimethanol initiator group at 5.105 ppm (singlet, relative area 1.0) and a pseudoquartet resonance for the —CH$_2$CH$_2$OH end group at 3.615, 3.637, 3.655 and 3.676 ppm (doublet of triplets, relative area 1.2). The fact that there is only a single major resonance shows that there is a polymer chain attached to both ends of the initiator molecule.

This illustrates that an hydroxyl ended polymer wherein the hydroxyl end is derived from a Z group cannot be prepared directly by this polymerization process, since "free" hydroxyl groups in the yttrium or rare earth metal initiators become active polymerization sites themselves.

EXAMPLE 29

Preparation of Yttrium Tris(2-phenylthioethoxide)

A solution of 2-phenylthioethanol (0.669 g, 4.34 mmol) in 4 ml of toluene was added dropwise to a stirred solution of yttrium tris(1,1,1,3,3,3-hexamethyldisilylamide) (0.824 g, 1.45 mmol) in 20 ml of toluene in a round bottomed flask. The mixture was stirred for 3 hr, after which the solvent was removed in vacuo to give an oil. $^1$H NMR in C$_6$D$_6$ shows a complex spectrum. The areas of the aromatic region and the aliphatic region are in the correct ratio for the desired composition.

EXAMPLE 30

Preparation of Yttrium Tris(1-methoxycarbonylethoxide)

Into a 100 ml RB flask under nitrogen containing a stirred solution of 1.485 g (2.60 mmol) of yttrium tris(1,1,1,3,3,3-hexamethyldisilylamide) in 22 ml of pentane was slowly added a suspension of S-methyl lactate (0.814 g, 7.81 mmol) in 10 ml of pentane. A precipitate formed during the addition and there was a mild exotherm. After stirring for 5 min, 20 ml of THF was added, and all of the solvent was removed in vacuo. The resulting solid was extracted with 25 ml of THF. The THF solution was filtered and enough pentane was added (about 10 ml) to cause cloudiness. The mixture was cooled to $-40°$ C., and the resulting crystals were isolated by vacuum filtration, followed by vacuum drying. The 0.50 g (48%) of solid product has a complex porton NMR spectrum, and absorbs in the IR (Nujol mull) at 1746(m), 1690(vs), and 1592(w) cm$^{-1}$.

EXAMPLE 31

Preparation of Samarium Tris(2-N,N-dimethylaminoethoxide)

Using a procedure similar to that in Example 34, the title compound was obtained as a white solid, mp 98°–98.5° C. Elemental analysis for $C_{12}H_{30}N_3Sm$. Calculated: C, 34.75%; H, 7.29%; N, 10.13%; Sm, 36.26%. Found: C, 32.92%, 33.23%, 33.60%, H, 6.98%, 7.10%, 7.03%; N, 9.65%, 9.77%; Sm, 36.9%, 37.0%.

EXAMPLE 32

Preparation of Dysprosium Tris(2-N,N-dimethylaminoethoxide)

Using a procedure similar to that in Example 34, the title compound was obtained as a brown oil. It was used without further purification.

EXAMPLE 33

Preparation of Yttrium Tris(4-hydroxymethylbenzyloxide)

To a stirred solution of 1,4-benzenedimethanol (0.276 g, 2.00 mmol) in 6 ml. of THF in a 100 ml. RB flask was added dropwise a solution of 0.247 g (0.50 mmol) of $Y(CH_2SiMe_3)_3(THF)_2$ in 2 ml. of THF. There was an immediate precipitation to give a cloudy white mixture. The suspension was diluted to total volume of 10 ml. with THF, and used as a polymerization catalyst.

EXAMPLE 34

Preparation of Yttrium Tris(2-N,N-dimethylaminoethoxide)

Yttrium triisopropoxide (2.5 g) was dissolved in a mixture of 10 ml. of toluene and 20 ml. of N,N-dimethylaminoethanol in a 125 ml. erlynmeyer flask and heated to reflux for 10 minutes. The hot solution was filtered and the solvents were removed in vacuo to give an oil. The oil was redissolved in toluene and stripped of solvent in vacuo two more times. The oil was then dissolved in 10 ml. of pentane and filtered.

The solvent was removed in vacuo to give a white crystalline solid, 3.10 g (82%). IR in nujol mull shows no evidence of free N,N-dimethylaminoethanol. $^1$H NMR ($C_6D_6$, 300 MHz): 2.0–3.0 (m, 8H, $CH_2NMe_2$), 4.23 (s, 2H, —$OCH_2$—). Elemental analysis for $C_{12}H_{30}N_3O_3Y$. Calculated: C, 40.80%; H, 8.56%; N, 11.9%; Y, 25.2%. Found: C, 39.50%, 39.55%; H, 8.26%, 8.37%; N, 11.4%, 11.4%; Y, 26.6%, 26.4%.

EXAMPLE 35

Preparation of $Y(OCH_2CH_2OEt)_3$

Using a procedure similar to Example 34, the title compound was obtained as a colorless oil. $^1$H NMR($C_6D_6$, 300 MHz): 1.0–1.5(m,3 H,$CH_3$); 3.4–4.8(m,6 H,$CH_2$). Elemental analysis for $C_{12}H_{27}O_6Y$. Calculated: C 40.46%; H,7.64%; Y,25.0%. Found: C, 39.79%, 39.87%; H, 7.81%, 7.34%; Y, 25.2).

EXAMPLE 36

Preparation of $Y[Me_3CC(=O)CHC(=O)(CMe_3)]_2(OCHMe_2)$

A solution of 2,2,8.6-tetramethyl-3,5-heptanedione (1.039 g, 5.64 mmol) dissolved in 6 ml of toluene was added to a solution of yttrium triisopropoxide (0.75 g, 2.82 mmol) in 8 ml of toluene in a 125 ml erlynmeyer flask. The mixture was heated to reflux for 5 minutes and then filtered and cooled to $-40°$ C. White crystalline product was isolated by filtration: 0.945 g (65%). $^1$H NMR ($C_6D_6$, 300 MHz): 1.226(s,36 H, $CMe_3$); 1.584(d,J=6.1 Hz, 8 H, $OCHMe_2$); 4.944 (septet, J=6.1 Hz, 1H, $OCHMe_2$); 5.947(s, 2H,$C(=O)CHC(=O)$). Elemental analysis for $C_{25}H_{45}O_5Y$: Calculated: C, 58.36%; H, 8.82%; Y, 17.3%. Found: C, 58.61%, 58.69%; H, 8.87%, 8.88%; Y, 17.8%, 17.5%.

EXAMPLE 37

Preparation of $Y(O$-Vitamin $D_3)_3$

A solution of Vitamin $D_3$ (1.012 g, 2.63 mmol) in 8 ml of toluene was added dropwise to a stirring solution of yttrium tris(1,1,1,3,3,3-hexamethyldisilylamide)(0.500 g, 0.877 mmol) in 10 ml of toluene. The yellow solution was protected from light and stored at room temperature overnight. The solvent was removed in vacuo to give a yellow solid. Melting point in a sealed capillary: 89°–91° C. $^1$H NMR($C_6D_6$, 300 MHz): complex spectrum but relative integrals of aliphatic region and olefinic region are correct.

EXAMPLE 38

Preparation of $Ba_2Y(OCH_2CH_2OCH_2CH_3)_7$

Barium metal, 5.16 g, was added to 75 ml. of $HOCH_2CH_2OCH_2CH_3$ and stirred until the hydrogen evolution was complete. Yttrium triisopropoxide, 5.00 g, in 20 ml. of toluene was then added to the solution and heated to reflux for 5 minutes in the glove box. The mixture was then filtered into a Schlenk flask and stripped on the Schlenk line, using a room temperature water bath. The crude product was then placed into the dry box and redissolved in toluene. It was then stripped to dryness on the Schlenk line. The dissolution and stripping were repeated two more times. A warm water bath was used in the latter two stripping operations. The crude product was then dissolved in pentane, filtered into a RB flask and stripped of solvent on the high vacuum line. The solid was powdered and continued to be dried on the high vacuum line. Yield: 18.10 g (98%).

Elemental Analysis for $Ba_2Y(OCH_2CH_2OCH_2CH_3)_7$:

Calculated Y, 9.00%; Ba, 27.82%; C, 34.06%; H, 6.43%.

Found: Y, 9.58%; Ba, 27.40%; C, 33.64%; H, 6.36%. Y, 9.51%; Ba, 27.30%; C, 33.46%; H, 6.54%.

EXAMPLE 39

Preparation of $Ba_2Y(OCH_2CH_2N(CH_3)_2)_7$

Barium metal, 1.37 g, was added to 20 ml. of $HOCH_2CH_2N(CH_3)_2$ and stirred until hydrogen evolution was complete. Yttrium triisopropoxide in 10 ml. of toluene was added to the reaction mixture and the entire contents heated to reflux for 5 minutes in the dry box. After the allotted time, the mixture was filtered into a Schlenk flask and stripped on the Schlenk line using a room temperature water bath. The crude product was redissolved in toluene inside the dry box and then solvent removed on the Schlenk line. The dissolution and stripping operation was performed an additional two times. After the second toluene stripping the sample had foamed to a white solid which was relatively dry. Attempted recrystallization from pentane failed. The crude product was then dissolved in pentane, filtered into a RB flask and stripped of solvent on the high vacuum line. The resulting solid was then powdered and dried at high vacuum. Yield: 4.60 g (94%).

Elemental Analysis for $Ba_2Y(OCH_2CH_2N(CH_3)_2)_7$:
Calculated: Y, 9.07%; Ba, 28.01%; C, 34.30%; H, 7.20%
N, 10.00%.
Found: Y, 9.27%; Ba, 28.20%; C, 33.55%; H, 7.08% N. 9.58%;
Y, 9.27%; Ba, 28.00%; C, 33.55%;
H, 7.21%; N, 9.55%.

EXAMPLE 40

Polymerization of R-Lactide with Samarium Tris-(2-N,N-dimethylaminoethoxide)

R-Lactide (5.09 g) was weight in an oven dried 100 ml. RB flask in a dry box. Methylene chloride (40 ml.) was added via syringe. To the stirred solution, under nitrogen, samarium tris(2-N,N-dimethylaminoethoxide) (0.5 ml. of an 0.2 M solution in toluene) was added. After one hour the polymerization was terminated with 50 ml. of 5% HCl. With additional methylene chloride added, the separated organic phase was washed again with 5% HCl (2×50 ml.), then with 5% sodium bicarbonate (1×50 ml.) and finally with water (3×50 ml.). The organic phase was dried over anhydrous sodium sulfate. After filtration, the organic solution was concentrated at reduced pressure and the lpolymer precipitated in hexanes, then filtered and dried under vacuum. Yield: 4.85 g (95.4%). GPC analysis: Mn =77,900, Mw =98,800, PD =1.27 (PET STD.).

EXAMPLE 41

Polymerization of S-Lactide with $Y(CH_2SiMe_3)_3(THF)_2$

In a dry box, S-lactide (5.28 g) was weighed into a 100 ml. RB flask equipped with a stirring bar. Methylene chloride (40 ml.) was added. To the stirred solution, under argon, $Y(CH_2SiMe_3)_3(THF)_2$ (1.0 ml. of an 0.1 M solution in toluene) was added. After 30 minutes the reaction was quenched with 50 ml. of 5% HCl. With additional methylene chloride added, the separated organic phase was again washed with 5% HCl (2×50 ml.), then with sodium bicarbonate (5%, 50 ml.) and finally with water (3×50 ml.). The separated organic phase was dried over anhydrous sodium sulfate, then filtered and concentrated via rotoevaporation. The polymer was precipitated in hexanes, then filtered and dried under vacuum at 45° C. Yield: 4.6 g (87.1%). GPC analysis: Mn =151,000, Mw =193,000, PD =1.28 (PET STD.).

EXAMPLE 42

Polymerization of ε-Caprolactone with $Ba_2Y(OCH_2CH_2NMe)_7$

Toluene (40 ml.) and ε-caprolactone (10.8 g) were added to an oven dried 100 ml. flask equipped with a stirring bar and a nitrogen bleed. To the stirred solution at room temperature $Ba_2Y(OCH_2CH_2NMe)_7$ (0.5 ml. of an 0.2 M solution of toluene) was added. After 3 hours the polymerization was quenched with 5% HCl (50 ml.). The organic phase was separated and again washed with 5% HCl (2×50 ml.) and then with water (3×50 ml.). The resulting organic phase was dried over anhydrous sodium carbonate. After filtration the filtrate was concentrated at reduced pressure, the resulting polymer then was dried under vacuum. Yield: 10.8 g (100%). GPC analysis: Mn =10,300, Mw =33,400, PD =3.21 (PMMA STD.).

EXAMPLE 43

Polymerization of ε-Caprolactone with $Ba_2Y(OCH_2CH_2OEt)_7$

To an oven dried 100 ml. flask equipped with a stirring bar and a nitrogen bleed were added toluene (40 ml.) and ε-caprolactone (7.49 g). To the stirred solution $Ba_2Y(OCH_2CH_2OEt)_7$ (0.5 ml. of an 0.2 M solution in toluene) was added. After 1 min. the polymerization was quenched with 5% HCl (50 ml.). Additional toluene was added and the separated organic phase washed again with 5% HCl (2×50 ml.) and then with water (3×50 ml.). After drying over anhydrous sodium carbonate and filtration, the filtrate was concentrated via rotoevaporation and the resulting polymer dried under vacuum. Yield: 7.30 g (98%).

EXAMPLE 44

Continuous Polymerization of ε-Caprolactone with Samarium Triisopropoxide

ε-Caprolactone (53.7 g) and toluene (400 ml) were placed in an oven dried 500 ml round bottom flask equipped with a nitrogen bleed and a syringe needle extending to the bottom of the flask. The syringe needle was attached to a 6.4 mm (inside diameter) Teflon TM tubing, which in turn was attached to a peristalic pump. From the pump the monomer solution flowed (6 ml/min) to a 3 way 6.4 mm Telfon TM connector ("T" mixer), one of which was fitted with a rubber septum through which samarium triisopropoxide (0.2 M solution in toluene) was metered in via a syringe pump at a rate of 0.26 ml/min. The "T" mixer was connected to the bottom of a stirred holdup chamber (capacity approximately 30 ml) by approximately 61 cm of Teflon TM tubing. The polymer was isolated from the thick solution exiting the holdup chamber via precipitation in wet hexanes. When the monomer supply was depleted 19 ml of samarium triisopropoxide was used. After filtering and drying under vacuum 45.4 g (84.5% yield) of white polymer was obtained with an inherent viscosity of 0.38 (1 g/100 ml of benzene at 30° C.).

This Example illustrates the use of a combined tubular (the Teflon TM tubing) and single stage continuous stirred tank reactor (holdup chamber) in a continuous reaction system.

EXAMPLE 45

Continuous Polymerization of S-Lactide with Samarium Tris(2-N,N-dimethylaminoethoxide)

S-Lactide (100 1 9) and methylene chloride (400 ml) were charged to an oven dried 500 ml flask equipped with a nitrogen bleed. After the S-lactide had dissolved a syringe needle extending to the bottom of the flask was attached. The syringe needle was in turn attached to a 6.4 mm (inside diameter) Teflon TM tubing through a peristalic pump. From the peristalic pump the S-lactide solution flowed (6 ml/min) to a 3 way Teflon TM connector ("T" mixer). One of the ports of the "T" mixer was equipped with a rubber septum through which samarium tris(2-N,N-dimethylaminoethoxide) (0.2M solution in toluene) was metered in at a rate of 0.26 ml/min. The "T" mixer was connected to two stirred holdup tanks (approximately 60 ml total capacity) in series by approximately 61 cm of 6.4 mm Teflon TM tubing. The exiting polymer solution was fed to a stirred tank containing wet hexanes, in which the polymer precipitated. After filtering and drying under vacuum overnight 83.7 g (83.6% yield) of polymer was obtained, having an inherent viscosity of 0.41 (1 g/100 ml of chloroform at 30° C.).

This Example illustrates the uses of a combined tubular (the Teflon TM tubing) and two stage continuous stirred tank reactor (holdup tanks) in a continuous reaction system.

Although preferred embodiments of the invention have been illustrated and described hereinabove, it is to be understood that there is no intent to limit the invention to the precise constructions herein disclosed, and it is to be further understood that the right is reserved to all changes and modifications coming within the scope of the invention as defined by the appended claims.

What is claimed is:

1. A compound of the formula $MZ_3$, wherein M is yttrium or a rare earth metal, two of the Z groups are 2,2,6,6,-tetramethylhepta-3,5-dionate and the other Z group is $-OCR^1_3$, $-NR^1_2$, or $-CR^1_3$ wherein $R^1$ is hydrogen, hydrocarbyl or substituted hydrocarbyl.

2. A compound of claim 1 wherein M is yttrium or a rare earth metal, two of the Z groups are 2,2,6,6-tetramethylhepta-3,5-dionate, and the third Z group is isopropoxide.

* * * * *